(12) United States Patent
Ren et al.

(10) Patent No.: US 7,369,321 B1
(45) Date of Patent: May 6, 2008

(54) VARIABLE-FOCUS LIQUID LENS

(75) Inventors: Hongwen Ren, Orlando, FL (US);
Shin-Tson Wu, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 11/653,735

(22) Filed: Jan. 16, 2007

(51) Int. Cl.
*G02B 1/06* (2006.01)

(52) U.S. Cl. .................. 359/666; 359/665; 359/667

(58) Field of Classification Search ......... 359/665–667
See application file for complete search history.

(56) References Cited

U.S. PATENT DOCUMENTS

| | | | |
|---|---|---|---|
| 4,783,155 A * | 11/1988 | Imataki et al. ............. | 359/666 |
| 5,138,494 A | 8/1992 | Kurtin ........................ | 359/666 |
| 5,526,067 A | 6/1996 | Cronin et al. .............. | 351/141 |
| 5,684,637 A | 11/1997 | Floyd ......................... | 359/666 |
| 5,999,328 A * | 12/1999 | Kurtin et al. .............. | 359/666 |
| 6,040,947 A | 3/2000 | Kurtin et al. .............. | 359/666 |
| 6,188,526 B1 * | 2/2001 | Sasaya et al. .............. | 359/666 |
| 6,233,098 B1 * | 5/2001 | Plesko ....................... | 359/666 |
| 6,344,930 B1 * | 2/2002 | Kaneko et al. ............. | 359/666 |
| 6,369,954 B1 | 4/2002 | Berge et al. ............... | 359/666 |
| 6,542,309 B2 * | 4/2003 | Guy ........................... | 359/666 |
| 6,665,127 B2 | 12/2003 | Bao et al. ................... | 359/665 |
| 6,715,876 B2 | 4/2004 | Floyd ........................ | 351/159 |
| 7,256,943 B1 * | 8/2007 | Kobrin et al. .............. | 359/666 |

* cited by examiner

*Primary Examiner*—Evelyn A. Lester
(74) *Attorney, Agent, or Firm*—Brian S. Steinberger; Phyllis K. Wood; Law Offices of Brian S. Steinberger, P.A.

(57) ABSTRACT

A variable focus liquid lens is formed using two substrates with at least two through holes in at least one of the substrates. One end of each through hole is covered with a distensible membrane, one on the exterior surface of the substrate and the other on the interior surface. The substrates are sealed about the periphery to form a chamber and the chamber is filled with a liquid material. When pressure is applied to the membrane the liquid in the chamber is redistributed to form the lens. The variable focus liquid-filled lens is formed by providing a first and second substrate, forming at least two through holes in at least one of the first and second substrate, sealing one end of each of the at least two holes with a flexible transparent membrane, and sandwiching a liquid in a chamber formed between the first and second substrate.

28 Claims, 7 Drawing Sheets

VARIABLE-FOCUS LIQUID LENS

This invention relates to optical focusing, in particular devices, methods, systems and apparatus for a liquid-based lens and associated zoom lens, wherein the focal length of the lens is variable.

BACKGROUND AND PRIOR ART

Adaptive-focus liquid lens has been used over the years for eyeglasses, cameras, projectors, cell phone as well as other machine vision applications. Based on the operating mechanisms and device structures, liquid lenses can be classified into three types. The first type is the liquid lens having a fixed volume of clear liquid which is sandwiched between a rigid lens (or a planar substrate) and a thin transparent elastic membrane, as described in U.S. Pat. Nos. 5,138,494, 5,999,328 and 6,040,947 issued to Kurtin et al. and U.S. Pat. No. 5,526,067 issued to Cronin et al. By moving the periphery of the elastic membrane, the liquid inside the lens assembly is redistributed such that the curvature of the film is changed. The changed curvature of the liquid lens surface bounded by the elastic membrane can vary the optical power, also known as diopter, of the lens. The shortcoming of this kind of liquid lenses is the difficulty keeping the periphery of the elastic membrane parallel to that of the rigid lens or planar substrate during the distance change. Moreover, the operating system for tuning the focus is complicated.

The second type of liquid lens requires to pump liquid in and out the lens chamber in order to change the curvature of the elastic membrane surface. Such an operating mechanism is described in U.S. Pat. Nos. 5,684,637 and 6,715,876 issued to Floyd. These lenses operate by injecting or pumping liquid into the body of the lens, a complicated control system is usually needed; thus such lenses are bulky, expensive and sensitive to vibration.

The third type of lens focuses light based on the electrowetting mechanism; an applied voltage can change the curvature of the liquid lens, see for example, U.S. Pat. No. 6,369,954 to Berge et al and U.S. Pat. No. 6,665,127 to Bao et al. By applying an external voltage to the liquid, the surface profile of the liquid is tuned because of the contact angle change. As a result, the focal length of the liquid lens is varied. Usually the applied voltage is high and the lens system is complicated and expensive. Another drawback of the electrowetting lens is that it is accompanied by liquid evaporation.

In the present invention, a tunable-focus liquid lens is demonstrated based on the pressure induced liquid redistribution. The liquid lens is composed of a flat cell and a liquid. The rigid flat cell has two through holes but these two holes are not overlapped. For example, one is on the top substrate and the other is on the bottom. The two holes are sealed with elastic membranes. One membrane is adhered on the outer surface of a substrate and the other is adhered on the inner surface of another substrate. For the convenience of discussion, hereinafter we call the former hole as the reservoir hole and the latter as the lens hole. The liquid is fully filled in the cell chamber and sealed using glue in order to prevent any leakage. Initially the two membranes are flat, so no focusing effect takes place. Squeezing the outside membrane inward by an actuator or other electro-mechanical means will redistribute the liquid rapidly, thus the inside membrane will swell outward. Because of this membrane shape change, focusing effect occurs.

To overcome these problems, what is needed is a lens with large aperture, large focusing power, polarization independence, wide spectral range (form visible to infrared), high resolution, and relatively fast response time for real-time imaging. The lens aperture size, in principle, has no constraint, depending on the applications. For instances, it can be made in micron sizes for microlens array, millimeter for call phone zoom lens, to several centimeters for eyeglasses.

SUMMARY OF THE INVENTION

A primary objective of the invention is to provide new methods, systems, apparatus and devices for a variable-focus liquid lens based on pressure induced liquid redistribution that can deform an elastic membrane with a spherical or other desired aspherical curvature during deformation.

A secondary objective of the invention is to provide new methods, systems, apparatus and devices for a variable-focus lens with large aperture, large focusing power, polarization independence, wide spectral range (form visible to infrared).

A third objective of the invention is to provide new methods, systems, apparatus and devices for a variable-focus lens that provides a unique and simple method for changing the curvature of the liquid-filled lens to vary its focal length.

A fourth objective of the invention is to provide new methods, systems, apparatus and devices for a variable-focus lens with high resolution, and relatively fast response time for real-time imaging.

A fifth objective of the invention is to provide new methods, systems, apparatus and devices for a variable-focus lens that exhibits attractive features including large focusing power, wide range of tunable focal length, large aperture, polarization independence, wide spectral range (limited by the transmittance of the employed components), high resolution, fast response time, and simple fabrication.

A sixth objective of the invention is to provide new methods, systems, apparatus and devices for a variable-focus lens for use in applications in real-time satellite imaging, surveillance, cellular phone zoom lens, etc.

According to the present invention, the variable focus liquid lens is composed of a flat cell chamber with a self-contained liquid. The cell chamber has at least two through holes. The holes are sealed with elastic membranes. One distensible membrane is adhered to the outer side of a substrate surface, referred to as the reservoir hole and the substrate is the top substrate. Another distensible membrane is used to seal the bottom hole, referred to as a lens hole from the inner side of the bottom substrate surface. The liquid is filled in the chamber and sealed with glue in order to prevent leakage. Depending on the amount of the liquid in the chamber, the initial curvature of the elastic membrane may be flat, convex, or concave.

In the variable-focus liquid lens, the distensible membrane of the reservoir hole can be squeezed inward and because the liquid is not constringent, the membrane of the lens hole is forced to swell outward and a lens character occurs. By squeezing the outer membrane with different pressure, the inner membrane is inflated with a different convex profile. Thus a variable focal length can be obtained and based on this operation mechanism, several different devices can be designed.

Another embodiment provides a method for producing a variable focus liquid-filled lens comprising the steps of providing a first and second substrate, forming at least two through holes in at least one of the first and second substrate, sealing one end of each of the at least two holes with a flexible transparent membrane, and sandwiching a liquid in a chamber formed between the first and second substrate.

The through holes include a first through hole in the first substrate, the first through holes sealed on the exterior surface of the first substrate and a second through hole is formed in the second substrates and is sealed on an interior surface of the second substrate. In an embodiment, the first substrate includes a concave or convex lens formed in one side of the first substrate and it is aligned with one of the through holes. The sandwiching steps is accomplished by sealing a periphery edge of the first and second substrate to form the chamber with an opening for the liquid, filling the chamber with the liquid, and sealing the opening to prevent the liquid from leaking.

These and other objects, feathers and advantages of this invention will be apparent from the following detailed description of the preferred embodiment that is illustrated schematically in the accompanying drawings.

BRIEF DESCRIPTION OF THE FIGURES

FIG. 1a is a perspective view of the two layers each with a hole formed there through.

FIG. 7b is a side view of the structure of a liquid lens array with the substrate shown in FIG. 7a.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

The following is a list of reference numerals used in the figures and throughout the description to identify elements of the present invention.

| | |
|---|---|
| 10 | top layer |
| 11 | reservoir hole |
| 12 | bottom layer |
| 13 | lens hole |
| 14 | top hole membrane cover |
| 15 | bottom hole membrane cover |
| 16 | adhesive |
| 17 | gap hole |
| 18 | cell chamber |
| 25 20 | top layer |
| 21 | bottom layer |
| 22 | top membrane cover |
| 23 | bottom membrane cover |
| 24 | liquid |
| 25 | ball-headed lever |
| 30 | top layer |
| 31 | bottom layer |
| 32 | right hole |
| 33 | right membrane cover |
| 34 | left hole |
| 35 | left membrane cover |
| 36 | liquid |
| 40 | upper layer |
| 41 | lens hole |
| 42 | convex lens |
| 50 | upper layer |
| 15 51 | lens hole |
| 52 | concave lens |
| 60 | top layer |
| 61 | bottom layer |
| 62 | right reservoir hole |
| 20 63 | lens hole |
| 64 | left reservoir hole |
| 70 | bottom layer |
| 71 | lens hole array |
| 72 | top layer |
| 25 73 | bottom membrane cover |
| 74 | top membrane cover |
| 75 | liquid filled cell chamber |

Figure 1A:
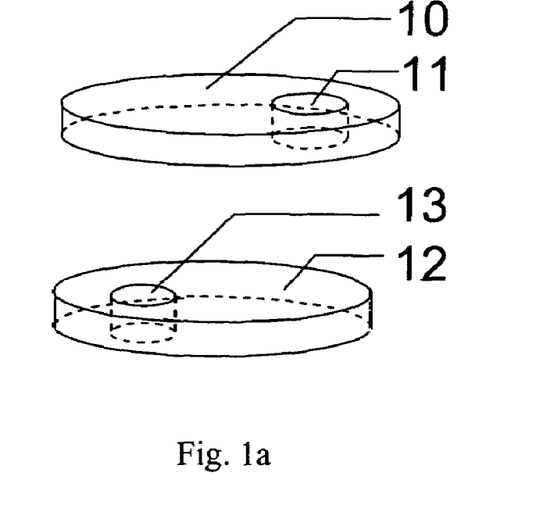

The present invention provides devices, methods, systems and apparatus for a liquid lens with a variable focal length. FIG. 1a shows a pair of layers, the top layer 10 has a reservoir hole 11 there though and the bottom layer 12 has a lens through hole 11. The material of the top and bottom layers 10 and 12 for the lens cell should be rigid, such as polycarbonate, glass, transparent crystal plate, rigid polymer, plastic, metal or other material that is obvious to those skilled in the art. In a preferred embodiment, the top layer 10 is a clear material while the bottom layer 12 is rigid it is not necessarily clear. The reservoir and lens holes 11 and 13 in the top and bottom layers 10 and 12 can be made by drilling, rubbing, patterning or other process that is commonly known to those skilled in the art. While the top and bottom layers are show as circular layer it is for illustration only, alternative geometric structure of the layers can be designed with disk-shape, square, rectangular or other special shape, depending on the applications.

Figure 1B:
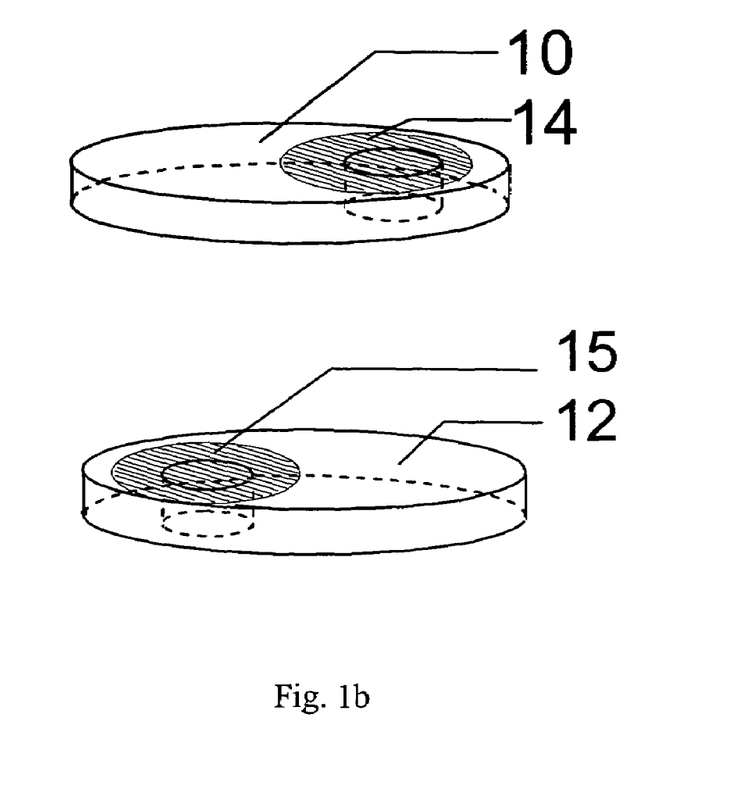
FIG. 1b is a perspective view of the two layers with one end of each hole sealed with an elastic membrane.

The reservoir hole 11 and lens hole 13 are sealed with an elastic membrane 13 and 14 as shown in FIG. 1b. In this example, the reservoir hole 11 is sealed on the outer surface of the top layer 10 with an elastic membrane 14 and the lens hole 13 in the bottom layer 12 is sealed with elastic membrane 15 on the outer top surface of the bottom layer 12. In the embodiment shown, the elastic membranes 14 and 15 are attached to the surface of the top and bottom layers 10 and 12. The elastic membrane is preferably a flexible, optically transparent, water impermeable material, such as Saran (polyvinylidene chloride resins or films) rubber, polydimethyl-silioxane (PDMS) membrane, or an elastic polymer. The elastic membrane may be adhered on the layers or may be wedged using a circular ring.

Figure 1C:
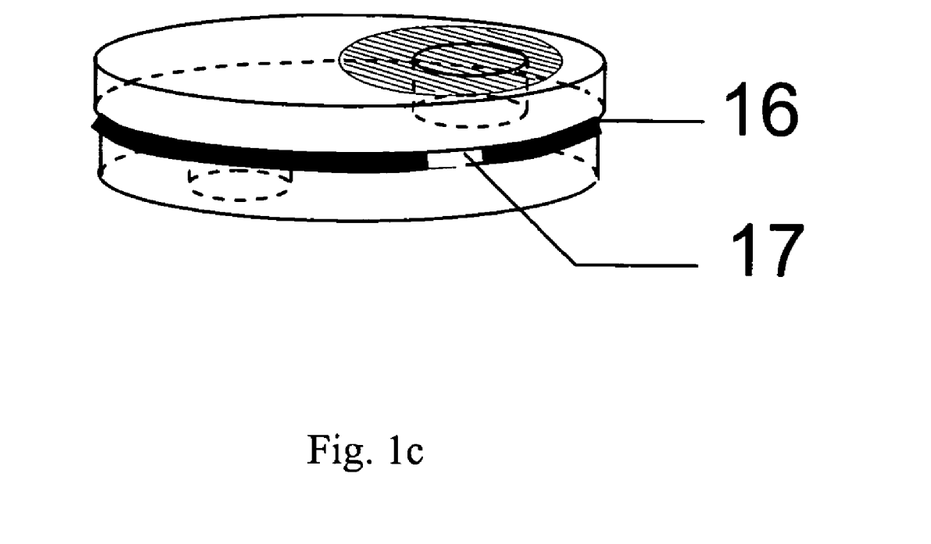
FIG. 1c is a perspective view of two layers adhered together with an adhesive material.

In the preferred embodiment, the variable-focus liquid lens is fabricated with a fluid filled in the cell chamber 18. A cell chamber 18 is formed between the top layer 10 and the bottom layer 12 as shown in FIG. 1c by leaving a thin gap between the top and bottom layers when adhering the periphery edges of the top and bottom layers 10 and 12 with an adhesive 16 material. In an embodiment, the size of the gap is controlled using polymer or glass strips when the periphery edge between the top and bottom layers 10 and 12 is sealed with the adhesive 16. In a preferred embodiment, the adhesive used for sealing the various structures is preferably cyanoacrylate, commonly known as "super glue," or alternatively an epoxy adhesive, or ultraviolet monomer can be substituted.

Figure 1D:
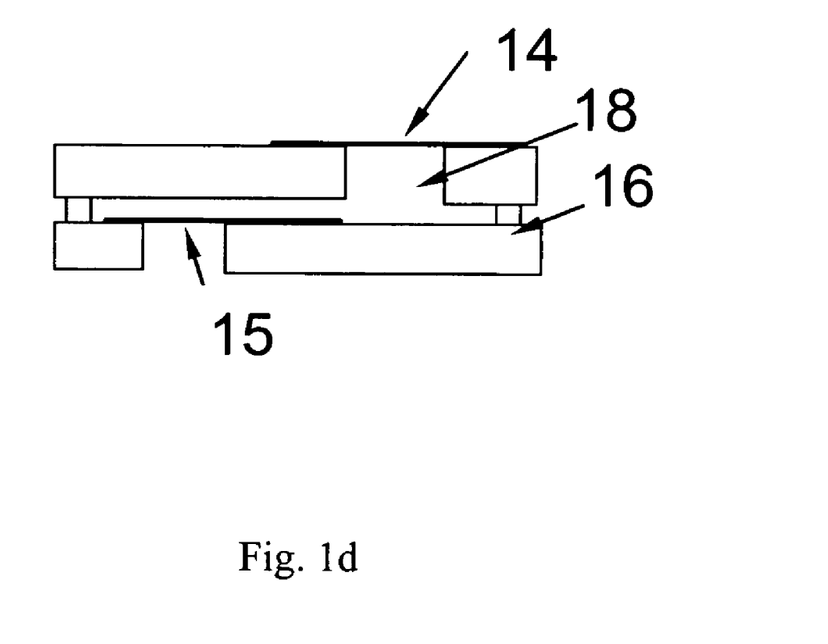
FIG. 1d is a side view of a structure of the lens cell with a clear liquid sealed inside a chamber between the two layers.

An opening 17 is left in the adhesive 16 for injecting liquid into the cell chamber 18 formed by the gap. FIG. 1d is a side view of the variable-focus liquid lens structure of the cell with liquid filled in the cell chamber 18. After the cell chamber 18 is filled with liquid, the opening 17 is sealed tightly with glue. The volume of liquid injected into the chamber 18 is controlled so that the top membrane 14 and bottom membrane 15 are flat.

The liquid encapsulated in the cell chamber 18 is preferably colorless, but can also be tinted, depending on the application of the variable-focus lens. For example, when the intended application is for sunglasses, the fluid is preferably tinted. Fluids having an appropriate index of refraction and viscosity suitable for use in the lens cell include but are not limited to liquids such as degassed water, mineral oil, glycerin and silicone products.

In this example, the cell chamber 18 has two holes but the holes are not overlapped as shown in FIGS. 1a through 1d. As described above, the lens hole 13 is sealed on the inner surface of the bottom layer using clear elastic membrane 15 and the reservoir hole 11 is sealed with elastic membrane 14 on the outer surface of the top layer. The periphery of the cell chamber 18, the space between the top and the bottom layer, is sealed to form the cell chamber which is filled with liquid prior to completing the seal to prevent liquid leakage.

While materials useful in the fabrication of the liquid lens of the present invention have been described, alternative material may be substituted without deviating from the scope of the present invention since those skilled in the art could easily select alternative materials that perform the desired function.

Figure 2:
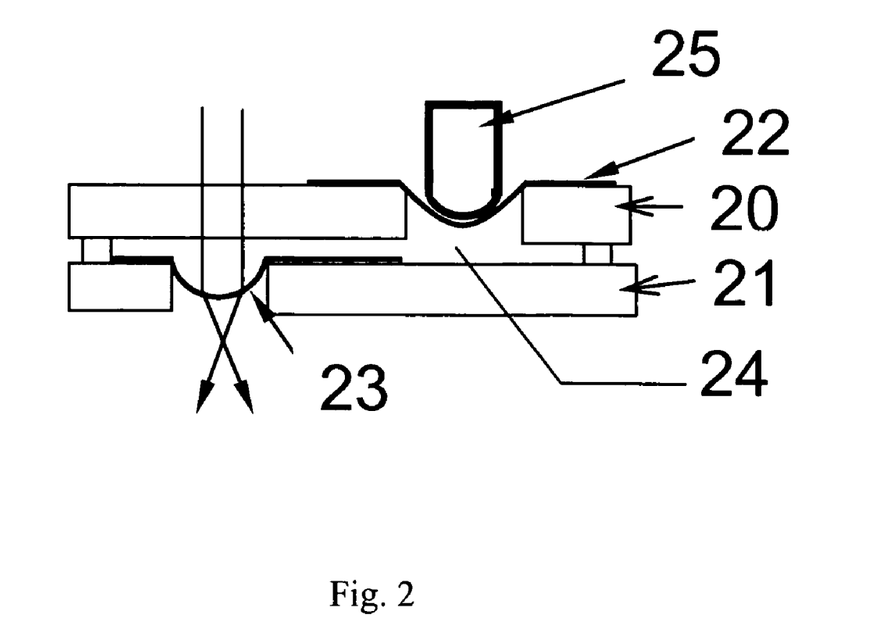
FIG. 2 is a side view of a lens showing the focus state of the lens cell with an inward pressure applied to an outer membrane.

When the elastic membrane 14 covering the reservoir hole 11 is pressed inward as shown in FIG. 2, liquid in the cell chamber 18 is redistributed, forcing the elastic membrane 15 covering the lens hole 13 to inflate outward. In the example shown in FIG. 2, the focusing effect of the cell chamber 24 as the membrane 22 on the top layer 20 is depressed inward using a ball-headed lever 25. The pressure propagates through liquid 24 and because the liquid 24 is not constringent, the pressure forces the distensible lower layer membrane 23 on the bottom layer 21 to swell outward. The extended membrane 23 acts as a spherical or aspherical profile, causing the outgoing light to focus.

Figure 3:
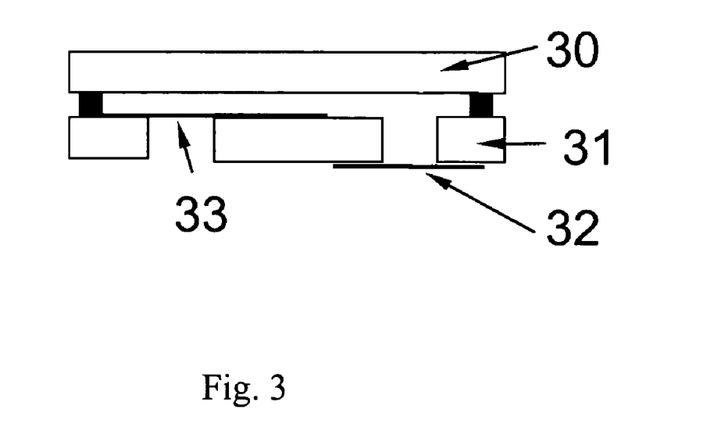
FIG. 3 is a side view of a structure of the lens cell with two holes in one layer according to an embodiment of the present invention.

FIG. 3 shows another kind of cell where the top layer 30 is clear with no any hole and the bottom layer 31 has two holes at the same side. The hole 32 is sealed by an elastic membrane 33 from outside. The hole 34 is adhered with an elastic membrane 35 from inside. Pressing the elastic membrane 33 inward of the cell can result in liquid in the chamber 36 to be redistributed. Thus, the elastic membrane 35 inflates outward.

Figure 4:
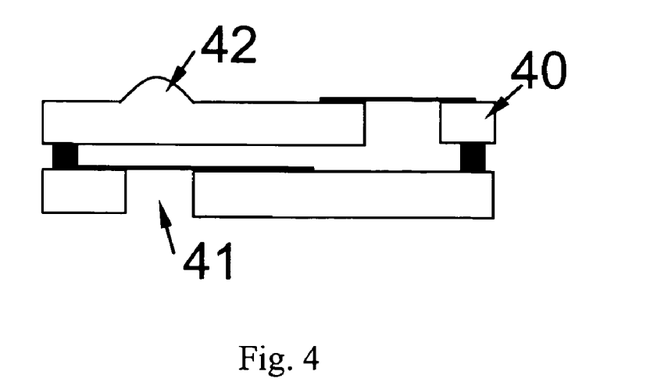
FIG. 4 is a side view of a structure of the lens cell with an initial positive focus.
Figure 5:
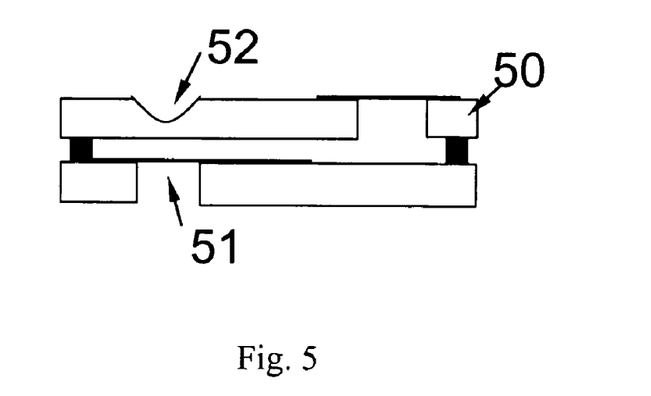
FIG. 5 is a side view of a structure of the lens cell with an initial negative focus.

The tunable focus lens configuration shown in FIG. 4 is similar to the configuration shown in FIG. 1d except the upper layer 40 has a convex lens 42 formed directly above the lens hole in the bottom substrate so that the center of the convex lens 42 is located at the center of lens hole 41. Similarly, the configuration shown in FIG. 5 is similar to FIG. 4 except the top layer 50 has a concave lens 52 centered directly above the center of lens hole 51.

Figure 6:
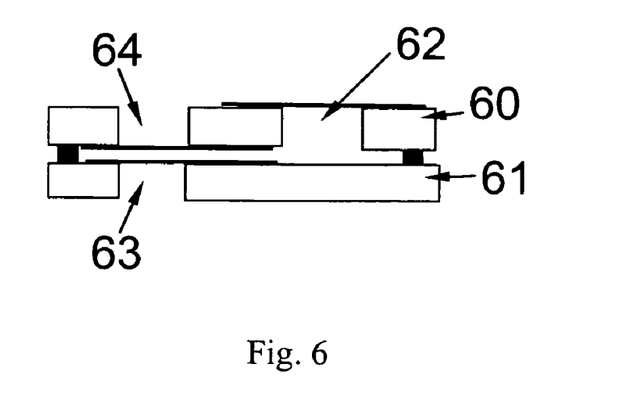
FIG. 6 is a side view of a structure of the lens cell with two lens holes overlapped in the top to bottom and bottom layers.

FIG. 6 shows yet another example of a variable-focus lens cell structure. In this example, the top layer 60 has two separated reservoir holes 62 and 64 and the bottom layer 61 has one lens hole 63. The left reservoir hole 63 and bottom lens holes 64 overlap and are sealed with elastic membrane respectively on the inside surface of the top layer and inside surface of the bottom layer. Alternatively, the holes can be sealed on the outer surface of the top and bottom layers. The hole 63 and the hole 64 should have the same aperture. The other reservoir hole 62 in the top layer 60 is sealed with an elastic membrane on the outer surface of the top layer.

Figure 7A:
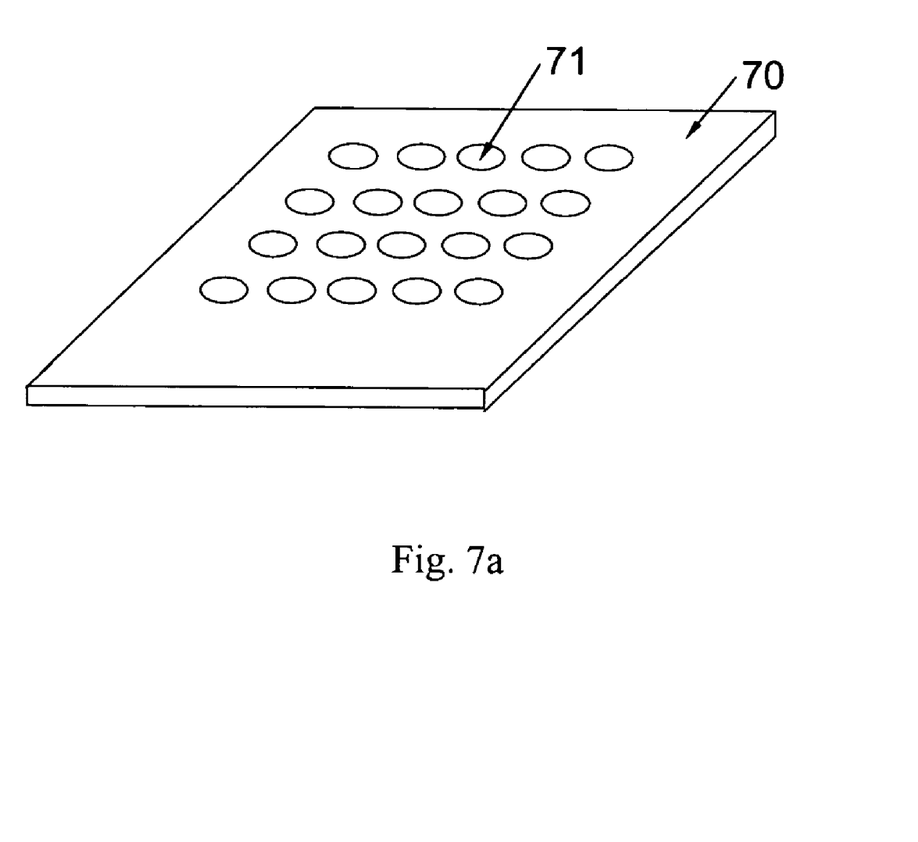
FIG. 7a is a perspective view of a substrate with an array of through holes according to an embodiment of the present invention.
Figure 7B:
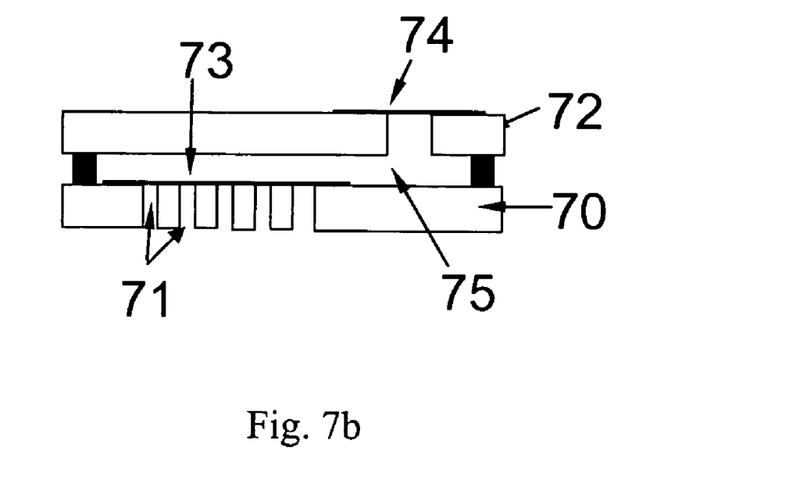

FIG. 7a shows the single layer 70 that has an array of holes 71. FIG. 7b shows the side view of a variable-focus cell structure with the layer 70 shown in FIG. 7a as the bottom layer 70 forming a cell chamber 75 between the top layer 72 and bottom layer 70. The array of lens holes 71 in the bottom layer are sealed with an elastic membrane 73 adhered to the inner surface of the bottom substrate adjacent to the liquid in the cell chamber 75. The single reservoir hole in the top substrate is sealed using an elastic membrane 74 on the outer surface of the top layer 72. As previously described, a liquid 75 is sealed in the cell chamber of the lens.

Figure 8A:
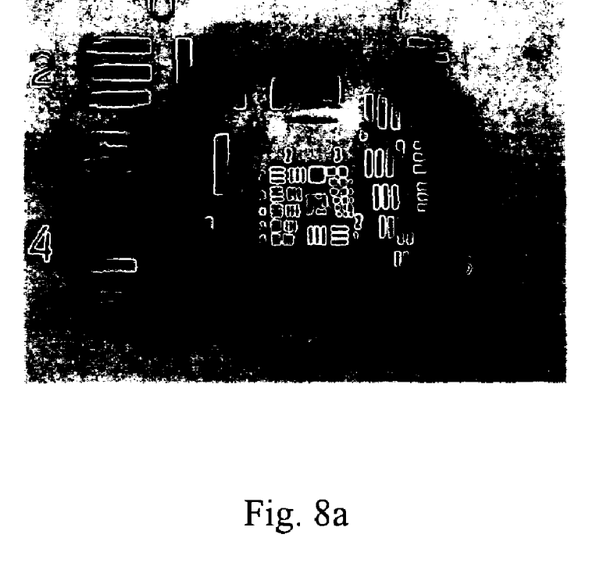
FIG. 8a shows the focal image of a lens cell with two holes in a non-focusing state.
Figure 8B:
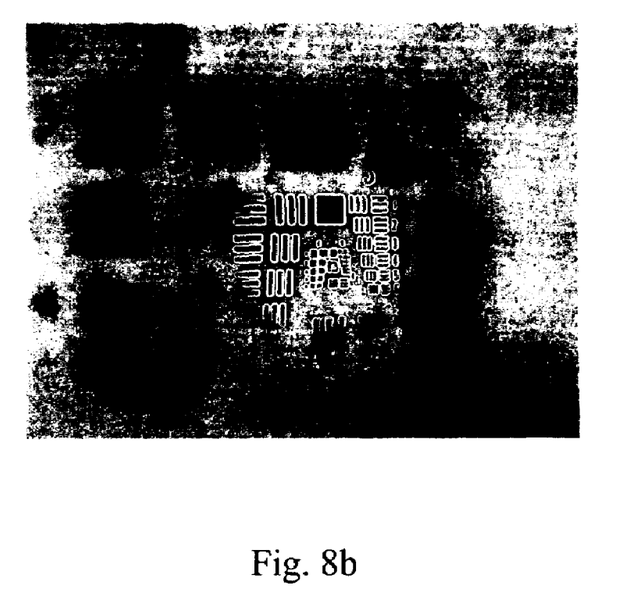
FIG. 8b shows the focal image of a lens cell with two holes in a focusing state.

FIG. 8a shows an experimentally demonstrated image in the non-focusing state of the lens structure shown in FIG. 1d, the incoming light is an ambient white light. FIG. 8b shows an experimentally demonstrated image in the focusing state of the lens structure shown in FIG. 2, as with the previous example, the incoming light is an ambient white light. In comparison with the image shown in FIG. 8a, the image in FIG. 8b is enlarged significantly. The variable-focus lens according to the present invention is polarization independent and has a resolution of approximately 30 line pairs per millimeter.

Figure 9:
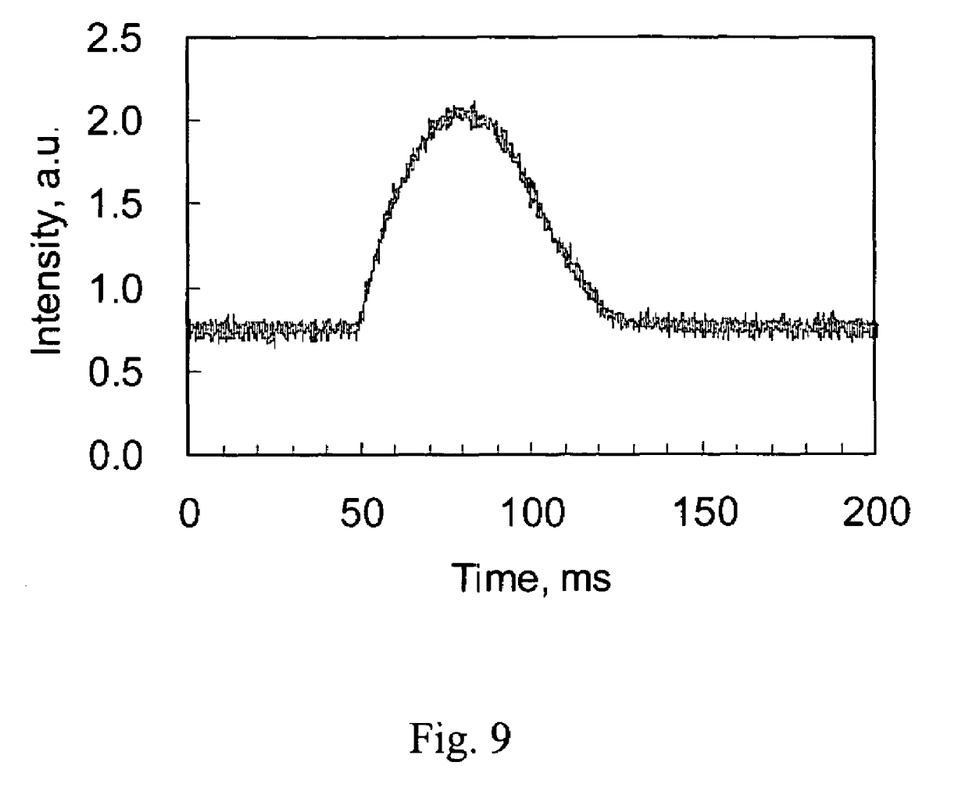
FIG. 9 is a graph showing the response time during focus change.

An experimentally measured response time during focus change is shown in the graph of FIG. 9. Response time is an important parameter for active imaging devices because it determines the data acquisition rate. The response time of a variable-focus liquid lens according to the present invention was measured by probing the lens activation using a He—Ne laser beam. Initially the lens has no focus, so the received beam intensity is weak. When the PDMS membrane is deformed to form a convex shape, the beam is converged increasing the light received by the photo-detector. As a result, a transmission peak is obtained. The rise time of the transmission depends on the impulse of the pressure. When the pressure is removed, the lens returns to its original state. As shown in FIG. 9, the lens recovery time is approximately 30 ms in this example. The lens response time is affected by the following factors: viscosity of the filled liquid, lens aperture, PDMS thickness, and the cell gap of the cell chamber. Selecting the appropriate liquid having a high index and low viscosity and by reducing the cell gap, the response time of the liquid lens is improved to achieve video rate response time for real time active imaging applications.

According to the above device structure and the device performance, the present invention provides a unique and simple method for changing the curvature of the liquid-filled lens to vary its focal length. The size of the reservoir and lens holes can varied so that the aperture of the liquid lens can be made in the millimeter to centimeter range. A single lens or lens array can be fabricated easily. The invented self-contained liquid lens exhibit following attractive features: polarization independence, large focusing power and wide focus-tuning range, high resolution, broad spectral bandwidth, fast response time, and simple fabrication process which leads to low cost.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A variable focus liquid-filled lens comprising:
    a first and a second substrate fixedly connected about a periphery of the first and second substrate to form a cell chamber therebetween, at least two through holes in at least one of the first and second substrate and at least one of the first and second substrate is a clear material;
    a distensible membrane attached to the at least one substrate to cover the at least two through holes;
    a liquid material within the cell chamber, wherein when pressure is applied to the distensible membrane the liquid material in the cell chamber is redistributed.

2. The variable focus liquid-filled lens of claim 1, wherein the at least one through hole comprises:
    a first through hole in the first substrate covered with a first distensible membrane on one of the inner and outer surface of the first substrate; and
    a second through hole in the second substrate covered with a second distensible membrane on an opposite one of the inner and outer surface of the second substrate, wherein the first and second hole are horizontally offset by a distance and when the pressure is applied to the outer surface distensible membrane the inner surface distensible membrane inflates outward.

3. The variable focus liquid-filled lens of claim 1, wherein the at least one through hole comprises:
    a first through hole in the first substrate covered with a first distensible membrane on one of the inner and outer surface of the first substrate; and
    a second through hole in the second substrate covered with a second distensible membrane on an opposite one of the inner and outer surface of the second substrate, wherein the first and second hole are aligned vertically and when the pressure is applied to the outer surface distensible membrane the inner surface distensible membrane inflates outward.

4. The variable focus liquid-filled lens of claim 2, further comprising:
    a convex lens formed on the outer surface of the one of the first and second substrate having the distensible membrane on the outer surface, the convex lens aligned exactly above the hole in the opposite substrate.

5. The variable focus liquid-filled lens of claim 2, further comprising:
    a concave lens formed on the outer surface of the one of the first and second substrate having the distensible membrane on the outer surface, the convex lens aligned exactly above the hole in the opposite substrate.

6. The variable focus liquid-filled lens of claim 1, wherein the at least two through holes comprises:
    a first and second through hole in one of the first and second substrate, one covered with a first distensible membrane on one of the inner surface and the other covered with a second distensible membrane on the outer surface of the substrate.

7. The variable focus liquid-filled lens of claim 6, further comprising:
    a third through hole in an opposite one of the first and second substrate, the third through hole aligned directly above one of the first and second through hole.

8. The variable focus liquid-filled lens of claim 1, wherein the at least one through hole comprises:
    an array of through holes in one of the first and second substrates covered with a first distensible membrane on an inner surface; and
    one through hole in the opposite one of the first and second substrate, the one through hole cover on the outer surface with a second distensible membrane.

9. The variable focus liquid-filled lens of claim 1, further comprising:
    an adhesive for sealing the periphery edges of the first and second substrate to prevent leakage of the liquid material.

10. The variable focus liquid-filled lens of claim 9, wherein the adhesive is selected from a group consisting of cyanoacrylate, an epoxy adhesive and an ultraviolet monomer.

11. The variable focus liquid-filled lens of claim 9, wherein the adhesive is preferably cyanoacrylate.

12. The variable focus liquid-filled lens of claim 1, wherein the first and second substrate comprise:
    a rigid material selected from a group including a polycarbonate, glass, transparent crystal plate, rigid polymer, and plastic.

13. The variable focus liquid-filled lens of claim 1, wherein the liquid material is selected from a group consisting of:
    degassed water, mineral oil, glycerin and silicone.

14. The variable focus liquid-filled lens of claim 1, wherein the liquid material is selected to have an index of refraction and viscosity suitable for an intended application.

15. The variable focus liquid-filled lens of claim 1, wherein the liquid material is tinted and the variable focus liquid filled lens is used for sunglasses.

16. The variable focus liquid-filled lens of claim 1, wherein the distensible membrane is a flexible, optically transparent, water impermeable material.

17. The variable focus liquid-filled lens of claim 1, wherein the distensible membrane is selected from a group consisting of:
    polyvinylidene chloride resin, polyvinylidene chloride film, rubber, polydimethyl-silioxane (PDMS) membrane and an elastic polymer.

18. The variable focus liquid-filled lens of claim 1, wherein the distensible membrane is wedged into each of the at least two holes using a circular ring.

19. The variable focus liquid-filled lens of claim 1, wherein a shape of the first and second substrates is one of circular, disk-shape, square or rectangular corresponding to an application of the variable focus liquid-filled lens.

20. A method for producing a variable focus liquid-filled lens comprising the steps of:
    providing a first and second substrate;

forming at least two through holes in at least one of the first and second substrate;

sealing one end of each of the at least two holes with a flexible transparent membrane, wherein at least one hole is sealed on an interior surface of the substrate and another hole is sealed on an exterior surface; and sandwiching a liquid in a chamber formed between the first and second substrate.

21. The method of claim 20, wherein the step forming at least two through holes comprises the step of:

forming a first through hole in the first substrate, the first through holes sealed on the exterior surface of the first substrate; and forming a second through hole in the second substrates, the second through holes sealed on an interior surface of the second substrate.

22. The method of claim 21, further comprising the step of:

vertically aligning the first and second through holes.

23. The method of claim 20 wherein the step of providing a first and second substrate comprises the step of:

providing a first substrate having one of a concave and a convex lens formed in one side of the first substrate; and aligning the lens with one of the first and second through holes.

24. The process of claim 20, wherein the sealing one end of each of the at least two holes with a flexible transparent membrane comprises the step of:

selecting a transparent flexible membrane material from a group consisting of elastomeric rubber, rubber-like compound, elastic polymer, and elastic Saran.

25. The process of claim 20, wherein the providing a first and second rigid substrate step comprises the step of:

selecting a substrate material from a group consisting of glass, clear crystal plate, transparent plastic, rigid clear polymer and metal.

26. The method of claim 20, wherein the step of sandwiching a liquid comprises the steps of:

sealing a periphery edge of the first and second substrate to form the chamber with an opening for the liquid;

filling the chamber with the liquid; and sealing the opening to prevent the liquid from leaking.

27. The method of claim 26, wherein sealing the periphery edge step includes the step of:

selecting at least one periphery sealing material from a group consisting of a light-weight plastic, light-weight metal, light-weight crystal, light-weight glass and solid polymeric resin.

28. The method of claim 26, wherein the step of filling the chamber includes the step of:

forming a convex lens with the liquid in the chamber, wherein the liquid deforms at least one of the flexible membranes covering the at least two holes.

* * * * *

UNITED STATES PATENT AND TRADEMARK OFFICE
CERTIFICATE OF CORRECTION

| | | |
|---|---|---|
| PATENT NO. | : 7,369,321 B1 | Page 1 of 1 |
| APPLICATION NO. | : 11/653735 | |
| DATED | : May 6, 2008 | |
| INVENTOR(S) | : Hongwen Ren | |

It is certified that error appears in the above-identified patent and that said Letters Patent is hereby corrected as shown below:

Col. 1, line 5 insert

-- STATEMENT REGARDING FEDERALLY SPONSORED RESEARCH OR DEVELOPMENT

This invention was funded in part by the US Army, federal contract number W911NF04C0048. --

Signed and Sealed this
First Day of March, 2011

David J. Kappos
*Director of the United States Patent and Trademark Office*